United States Patent
Hatano et al.

(10) Patent No.: US 11,808,393 B2
(45) Date of Patent: Nov. 7, 2023

(54) MANIFOLD

(71) Applicant: CKD Corporation, Aichi (JP)

(72) Inventors: Hisashi Hatano, Aichi (JP); Mitsuhiro Kosugi, Aichi (JP)

(73) Assignee: CKD CORPORATION, Aichi (JP)

( * ) Notice: Subject to any disclaimer, the term of this patent is extended or adjusted under 35 U.S.C. 154(b) by 498 days.

(21) Appl. No.: 17/255,942

(22) PCT Filed: Mar. 31, 2020

(86) PCT No.: PCT/JP2020/014726
§ 371 (c)(1),
(2) Date: Dec. 23, 2020

(87) PCT Pub. No.: WO2020/217876
PCT Pub. Date: Oct. 29, 2020

(65) Prior Publication Data
US 2021/0262599 A1 Aug. 26, 2021

(30) Foreign Application Priority Data

Apr. 26, 2019 (JP) ................................. 2019-085690

(51) Int. Cl.
*F16L 39/00* (2006.01)
*F16L 37/091* (2006.01)
(Continued)

(52) U.S. Cl.
CPC .......... *F16L 37/091* (2013.01); *F16K 27/003* (2013.01); *F16L 41/02* (2013.01)

(58) Field of Classification Search
CPC ... F16L 37/091; F16L 37/0915; F16L 37/098; F16L 37/0982; F16L 39/00; F16L 39/02; F16L 39/06; F16L 41/02
See application file for complete search history.

(56) References Cited

U.S. PATENT DOCUMENTS 3,958,593 A * 5/1976 Christie .................. F16L 47/34
285/197
5,699,834 A * 12/1997 Hayashi .............. F15B 13/0817
137/271
(Continued)

FOREIGN PATENT DOCUMENTS

JP S60161778 U 10/1985
JP H09100932 A 4/1997
(Continued)

OTHER PUBLICATIONS

Office Action issued in connection with corresponding Korean Patent Application No. 10-2020-7036909 dated Dec. 22, 2020.

Primary Examiner — Aaron M Dunwoody
(74) Attorney, Agent, or Firm — Tarolli, Sundheim, Covell & Tummino, LLP

(57) ABSTRACT

Parts of a first coupling and a second coupling that protrude from manifold blocks each have the shape of an elongated tube. When the first coupling and the second coupling are viewed in the axial direction, the traverse direction of the first coupling and the second coupling agree with the arrangement direction of manifold blocks. A part of the tube insertion hole is a small diameter hole, which is a stadium-shaped hole. When the first coupling and the second coupling are viewed in the axial direction, the traverse direction of the small diameter hole agrees with the traverse direction of the first coupling and the second coupling.

5 Claims, 5 Drawing Sheets

(51) Int. Cl.
    *F16K 27/00*     (2006.01)
    *F16L 41/02*     (2006.01)

(56) References Cited

U.S. PATENT DOCUMENTS

| | | | |
|---|---|---|---|
| 5,765,877 A | 6/1998 | Sakane et al. | |
| 11,480,280 B2 * | 10/2022 | Langer | F16L 37/34 |
| 2003/0160451 A1 * | 8/2003 | Min-Cheol | F16L 37/0927 |
| | | | 285/358 |
| 2003/0193187 A1 * | 10/2003 | Takada | F16L 37/144 |
| | | | 285/120.1 |
| 2009/0119826 A1 * | 5/2009 | Coronado | F16L 27/11 |
| | | | 137/15.01 |
| 2010/0102550 A1 * | 4/2010 | Hama | F16L 27/0845 |
| | | | 285/127.1 |
| 2014/0197629 A1 * | 7/2014 | Barthel | F16L 37/0841 |
| | | | 285/93 |
| 2014/0261279 A1 * | 9/2014 | Horii | F02M 35/112 |
| | | | 123/184.61 |
| 2017/0009920 A1 * | 1/2017 | Canatella | A61M 39/1011 |
| 2017/0276532 A1 * | 9/2017 | Schmidt | F16N 25/02 |

FOREIGN PATENT DOCUMENTS

| | | |
|---|---|---|
| JP | H1026278 A | 1/1998 |
| JP | 2002039419 A | 2/2002 |
| JP | 2004276137 A | 10/2004 |
| JP | 3151615 U | 6/2009 |
| TW | 347458 B | 12/1998 |

* cited by examiner

MANIFOLD

RELATED APPLICATIONS

The present invention is a U.S. National Stage under 35 USC 371 patent application, claiming priority to Serial No. PCT/JP2020/014726, filed on 31 Mar. 2020; which claims priority of JP 2019-085690, filed on 26 Apr. 2019, the entirety of both of which are incorporated herein by reference.

TECHNICAL FIELD

The present invention relates to a manifold including couplings into which flexible tubes, each flexible tube having a circular cross section, are inserted.

BACKGROUND ART

As disclosed in Patent Document 1, a manifold includes multiple manifold blocks, multiple electromagnetic valves, and multiple couplings. The manifold blocks are arranged in one direction. Each manifold block includes a passage formed in it. An electromagnetic valve is mounted on each manifold block. A tubular coupling protrudes outward from the manifold block. The coupling includes a tube insertion hole, which is connected to the passage of the manifold block. The couplings are adjacent to each other in the arrangement direction of the manifold blocks. For example, flexible tubes, each flexible tube having a circular cross section, are inserted into the respective tube insertion holes.

In order to increase the flow rate of fluid that flows in the passage of the manifold block, a tube having a large cross-sectional flow area is inserted into the tube insertion hole in some cases. In such a case, the diameter of the tube insertion hole of the coupling needs to be increased in accordance with the cross-sectional flow area of the tube. For example, in a case in which the tube insertion hole of the coupling is a circular hole, the outer diameter of the coupling is increased as the diameter of the tube insertion hole is increased. Thus, if the outer diameter of the coupling is excessively increased, the couplings adjacent to each other in the arrangement direction of the manifold blocks are likely to interfere with each other. In such a case, the interval between adjacent manifold blocks may be increased so that the adjacent couplings do not interfere with each other. However, an increase in the interval between the adjacent manifold blocks results in an enlarged size of the manifold in the arrangement direction of the manifold blocks.

PRIOR ART DOCUMENT

Patent Document

Patent Document 1: Japanese Laid-Open Patent Publication No. 2002-39419

SUMMARY OF THE INVENTION

Problems that the Invention is to Solve

It is an objective of the present invention to provide a manifold that is capable of increasing the flow rate of fluid flowing in a passage, while limiting an increase in the size.

Means for Solving the Problems

In a first aspect of the present invention, a manifold is provided that includes passage forming members and tubular couplings. The passage forming members are arranged in one direction. Each passage forming member has a passage inside. The tubular couplings partially protrude outward from the respective passage forming members. Each coupling includes a tube insertion hole connected to the passage. The couplings are adjacent to each other in an arrangement direction of the passage forming members. Flexible tubes, each having a circular cross section, are inserted into respective tube insertion holes of the couplings. Parts of the couplings that protrude from the passage forming members each have a shape of an elongated tube. When each coupling is viewed in an axial direction, a traverse direction of the coupling agrees with the arrangement direction. At least part of each tube insertion hole is a stadium-shaped small diameter hole. When each coupling is viewed in the axial direction, a traverse direction of the small diameter hole agrees with the traverse direction of the coupling.

MODES FOR CARRYING OUT THE INVENTION

A manifold according to one embodiment will now be described with reference to FIGS. 1 to 5. The manifold of the present embodiment is an electromagnetic valve manifold that includes multiple electromagnetic valves.

Figure 1:
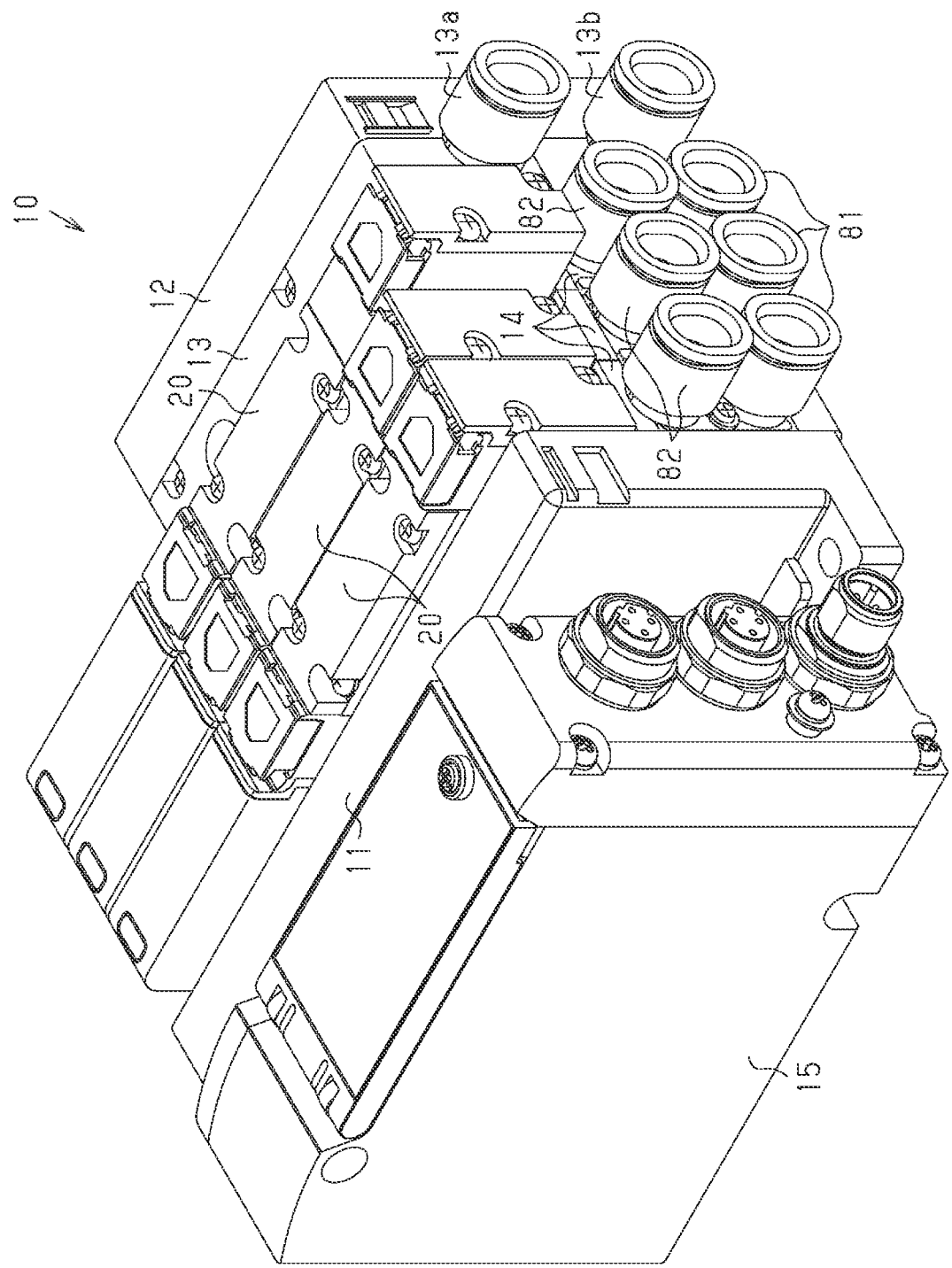
FIG. 1 is a perspective view of an electromagnetic valve manifold according to one embodiment.

As shown in FIG. 1, an electromagnetic valve manifold 10 includes a first end block 11, a second end block 12, a supply-discharge block 13, and multiple manifold blocks 14. The first end block 11, the second end block 12, the supply-discharge block 13, and the manifold blocks 14 are arranged in that order in one direction.

The supply-discharge block 13 includes a supply coupling 13a and a discharge coupling 13b. The supply coupling 13a includes a first end, which is connected to a concentrated supply passage (not shown) inside the supply-discharge block 13. The supply coupling 13a also includes a second end, which is connected to a fluid supply source (not shown), for example, via piping. The discharge coupling 13b includes a first end, which is connected to a concentrated discharge passage (not shown) inside the supply-discharge block 13. The discharge coupling 13b also includes a second end, which is open to the atmosphere, for example, via piping.

An electromagnetic valve 20 is mounted on each of the manifold blocks 14. The electromagnetic valve manifold 10 also includes a power supply block 15 for supplying power to the electromagnetic valves 20. The power supply block 15 is arranged on the opposite side of the first end block 11 from the manifold blocks 14. The first end block 11, the second end block 12, the supply-discharge block 13, the manifold blocks 14, and the power supply block 15 are elongated rectangular blocks. Adjacent ones of the blocks are coupled to each other while being held in contact with each other.

Figure 2:
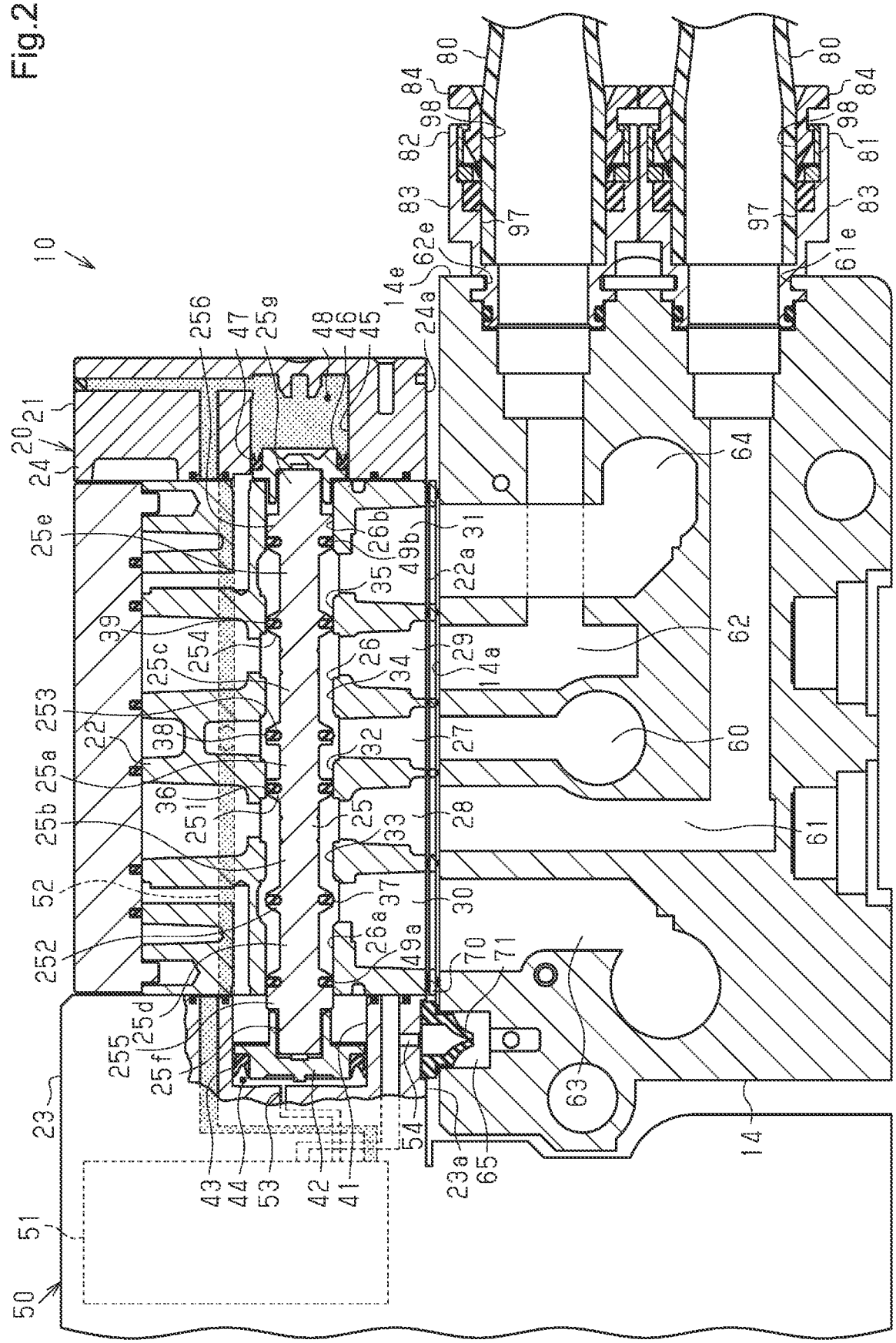
FIG. 2 is a longitudinal cross-sectional view of the electromagnetic valve manifold.

As shown in FIG. 2, each electromagnetic valve 20 includes a valve body 21, which is shaped like an elongated rectangular block. The valve body 21 is placed on a placement surface 14a of the manifold block 14. The valve body 21 includes an elongated rectangular block-shaped body main portion 22, a first coupling block 23, which is coupled to a first end in the longitudinal direction of the body main portion 22, and a second coupling block 24, which is coupled to a second end in the longitudinal direction of the body main portion 22. The body main portion 22, the first coupling block 23, and the second coupling block 24 are made of, for example, plastic. The body main portion 22 includes a main portion facing surface 22a, which faces the placement surface 14a. The first coupling block 23 includes a first facing surface 23a, which faces the placement surface 14a. The second coupling block 24 includes a second facing surface 24a, which faces the placement surface 14a.

The body main portion 22 includes a circular valve hole 26, which accommodates a valve member 25. The valve hole 26 extends in the longitudinal direction of the body main portion 22. The valve hole 26 includes a first end, which opens in a first end face in the longitudinal direction of the body main portion 22. The valve hole 26 also includes a second end, which opens in a second end face in the longitudinal direction of the body main portion 22. The valve hole 26 thus extends through the body main portion 22 in the longitudinal direction. The valve member 25 is a spool valve member accommodated in the valve hole 26. The valve member 25 is allowed to reciprocate in the valve hole 26.

The body main portion 22 includes a supply port 27, a first output port 28, a second output port 29, a first discharge port 30, and a second discharge port 31. The electromagnetic valves 20 is a five-port electromagnetic valve.

The first discharge port 30, the first output port 28, the supply port 27, the second output port 29, the second discharge port 31 are arranged in that order from the first end toward the second end of the body main portion 22. The first ends of the supply port 27, the first output port 28, the second output port 29, the first discharge port 30, and the second discharge port 31 are connected to the valve hole 26. The second ends of the supply port 27, the first output port 28, the second output port 29, the first discharge port 30, and the second discharge port 31 open in the main portion facing surface 22a of the body main portion 22.

The inner circumferential surface of the valve hole 26 includes a first valve seat 32 between the supply port 27 and the first output port 28. The inner circumferential surface of the valve hole 26 also includes a second valve seat 33 between the first output port 28 and the first discharge port 30. A third valve seat 34 is provided between the supply port 27 and the second output port 29. A fourth valve seat 35 is provided between the second output port 29 and the second discharge port 31. The first valve seat 32, the second valve seat 33, the third valve seat 34, and the fourth valve seat 35 form parts of the inner circumferential surface of the valve hole 26 and are annular.

The valve hole 26 also includes a first hole section 26a. The first hole section 26a is connected to the first discharge port 30 and forms a first end of the valve hole 26, which is spaced apart from the second valve seat 33. The valve hole 26 further includes a second hole section 26b. The second hole section 26b is connected to the second discharge port 31 and forms a second end of the valve hole 26, which is spaced apart from the fourth valve seat 35. The first valve seat 32, the second valve seat 33, the third valve seat 34, the fourth valve seat 35, the first hole section 26a, and the second hole section 26b have the same inner diameter.

The valve member 25 includes a first valve portion 251, a second valve portion 252, a third valve portion 253, a fourth valve portion 254, a fifth valve portion 255, and a sixth valve portion 256, which are spaced apart from each other in the axial direction of the valve member 25. The fifth valve portion 255, the second valve portion 252, the first valve portion 251, the third valve portion 253, the fourth valve portion 254, the sixth valve portion 256 are arranged in that order from the first end toward the second end in the axial direction of the valve member 25. The first valve portion 251, the second valve portion 252, the third valve portion 253, the fourth valve portion 254, the fifth valve portion 255, and the sixth valve portion 256 have the same outer diameter.

The valve member 25 includes a first shaft portion 25a, which couples the first valve portion 251 and the third valve portion 253 to each other, a second shaft portion 25b, which couples the first valve portion 251 and the second valve portion 252 to each other, and a third shaft portion 25c, which couples the third valve portion 253 and the fourth valve portion 254 to each other. The valve member 25 also includes a fourth shaft portion 25d, which couples the second valve portion 252 and the fifth valve portion 255 to each other, and a fifth shaft portion 25e, which couples the fourth valve portion 254 and the sixth valve portion 256 to each other.

The valve member 25 includes a columnar first protruding portion 25f. The first protruding portion 25f protrudes from the end face of the fifth valve portion 255 that is opposite from the fourth shaft portion 25d. The first protruding portion 25f is a first end in the axial direction of the valve member 25. The valve member 25 also includes a columnar second protruding portion 25g. The second protruding portion 25g protrudes from the end face of the sixth valve portion 256 that is opposite from the fifth shaft portion 25e. The second protruding portion 25g is a second end in the axial direction of the valve member 25.

The first shaft portion 25a, the second shaft portion 25b, the third shaft portion 25c, the fourth shaft portion 25d, the fifth shaft portion 25e, the first protruding portion 25f, and the second protruding portion 25g have the same outer diameter. The outer diameters of each of the first valve portion 251, the second valve portion 252, the third valve portion 253, the fourth valve portion 254, the fifth valve portion 255, and the sixth valve portion 256 are larger than the outer diameters of each of the first shaft portion 25a, the second shaft portion 25b, the third shaft portion 25c, the fourth shaft portion 25d, the fifth shaft portion 25e, the first protruding portion 25f, and the second protruding portion 25g.

A first spool packing 36 is attached to the outer circumferential surface of the first valve portion 251. The first spool packing 36 serves as a seal between the supply port 27 and the first output port 28 when the first valve portion 251 is seated on the first valve seat 32. A second spool packing 37 is attached to the outer circumferential surface of the second valve portion 252. The second spool packing 37 serves as a seal between the first output port 28 and the first discharge port 30 when the second valve portion 252 is seated on the second valve seat 33. A third spool packing 38 is attached to the outer circumferential surface of the third valve portion 253. The third spool packing 38 serves as a seal between the supply port 27 and the second output port 29 when the third valve portion 253 is seated on the third valve seat 34. A fourth spool packing 39 is attached to the outer circumferential surface of the fourth valve portion 254. The fourth spool packing 39 serves as a seal between the second output port 29 and the second discharge port 31 when the fourth valve portion 254 is seated on the fourth valve seat 35. The first spool packing 36, the second spool packing 37, the third spool packing 38, and the fourth spool packing 39 are made of rubber and are annular.

The first coupling block 23 includes a first piston accommodating recess 41, which is a circular hole connected to the first hole section 26a. The first protruding portion 25f of the valve member 25 is configured to selectively enter the first piston accommodating recess 41 from the first hole section 26a and retract from the first hole section 26a into the first piston accommodating recess 41. The first piston accommodating recess 41 accommodates a disk-shaped first piston 42, while allowing the first piston 42 to reciprocate. The first piston 42 is attached to the distal end of the first protruding portion 25f of the valve member 25. A first lip packing 43 is attached to the outer circumferential surface of the first piston 42. The first lip packing 43 serves as a seal between the first piston 42 and the inner circumferential surface of the first piston accommodating recess 41. The first piston 42 defines a first pilot pressure chamber 44 inside the first piston accommodating recess 41. Pilot fluid is supplied to and discharged from the first pilot pressure chamber 44.

The second coupling block 24 includes a second piston accommodating recess 45, which is connected to the second hole section 26b. The inner diameter of the second piston accommodating recess 45 is smaller than that of the first piston accommodating recess 41. The second protruding portion 25g of the valve member 25 is configured to selectively enter the second piston accommodating recess 45 from the second hole section 26b and retract from the second piston accommodating recess 45 into the second hole second hole section 26b. The second piston accommodating recess 45 accommodates a disk-shaped second piston 46, while allowing the second piston 46 to reciprocate. The second piston 46 is attached to the distal end of the second protruding portion 25g of the valve member 25. The outer diameter of the second piston 46 is smaller than that of the first piston 42. A second lip packing 47 is attached to the outer circumferential surface of the second piston 46. The second lip packing 47 serves as a seal between the second piston 46 and the inner circumferential surface of the second piston accommodating recess 45. The second piston 46 defines a second pilot pressure chamber 48 inside the second piston accommodating recess 45. Pilot fluid is supplied to and discharged from the second pilot pressure chamber 48.

The outer diameter of the second piston 46 is smaller than that of the first piston 42. Accordingly, the pressure receiving area of the second piston 46, which receives the pressure of the pilot fluid in the second pilot pressure chamber 48, is smaller than the pressure receiving area of the first piston 42, which receives the pressure of the pilot pressure in the first pilot pressure chamber 44.

A first seal member 49a is attached to the outer circumferential surface of the fifth valve portion 255. The first seal member 49a serves as a seal between the fifth valve portion 255 and the first hole section 26a. The first seal member 49a is annular and made of rubber. The first seal member 49a limits leakage of fluid from the first discharge port 30 to the first piston accommodating recess 41 via the first hole section 26a.

A second seal member 49b is attached to the outer circumferential surface of the sixth valve portion 256. The second seal member 49b serves as a seal between the sixth valve portion 256 and the second hole section 26b. The second seal member 49b is annular and made of rubber. The second seal member 49b limits leakage of fluid from the second discharge port 31 to the second piston accommodating recess 45 via the second hole section 26b.

Each electromagnetic valve 20 includes a pilot valve unit 50. The electromagnetic valve 20 is of a single pilot type having a single pilot valve unit 50. The pilot valve unit 50 includes a solenoid portion 51. The pilot valve unit 50 is coupled to an end of the first coupling block 23 on the side opposite from the body main portion 22.

Further, the valve body 21 includes a pilot fluid supply passage 52, which is connected to the supply port 27 via the valve hole 26. The pilot fluid supply passage 52 opens in the valve hole 26 at a position connected to the supply port 27, regardless of the position of the valve member 25. The pilot fluid supply passage 52 bifurcates in the middle and is connected to the pilot valve unit 50 and the second pilot pressure chamber 48. Pilot fluid is constantly supplied to the second pilot pressure chamber 48 from the supply port 27 via the pilot fluid supply passage 52.

The first coupling block 23 includes a pilot fluid output passage 53, which connects the pilot valve unit 50 and the first pilot pressure chamber 44 to each other. Further, the first coupling block 23 includes a valve-side pilot fluid discharge passage 54, which discharges pilot fluid. The valve-side pilot fluid discharge passage 54 includes a first end, which is connected to the pilot valve unit 50. The valve-side pilot fluid discharge passage 54 includes a second end, which opens in the first facing surface 23a of the first coupling block 23.

Each manifold block 14 includes a supply passage 60, a first output passage 61, a second output passage 62, a first discharge passage 63, and a second discharge passage 64. Thus, the manifold blocks 14 are passage forming members that are arranged in one direction and each have a passage inside.

The supply passage 60, the first output passage 61, the second output passage 62, the first discharge passage 63, and the second discharge passage 64 respectively open in the placement surface 14a. The end of the supply passage 60 that opens in the placement surface 14a is connected to the supply port 27. The end of the first output passage 61 that opens in the placement surface 14a is connected to the first output port 28. The end of the second output passage 62 that opens in the placement surface 14a is connected to the second output port 29. The end of the first discharge passage 63 that opens in the placement surface 14a is connected to the first discharge port 30. The end of the second discharge passage 64 that opens in the placement surface 14a is connected to the second discharge port 31.

The end of the supply passage 60 on the side opposite from the placement surface 14a extends through each manifold block 14 in the arrangement direction of the manifold blocks 14. The supply passages 60 of the manifold blocks 14 adjacent to each other are connected to each other. The end of the first discharge passage 63 that is on the side opposite from the placement surface 14a and the end of the second discharge passage 64 that is on the side opposite from the placement surface 14a extend through each manifold block 14 in the arrangement direction of the manifold blocks 14. The first discharge passages 63 of the manifold blocks 14 adjacent to each other are connected to each other. The second discharge passages 64 of the manifold blocks 14 adjacent to each other are connected to each other. In the manifold block 14 closest to the first end block 11, the ends of the supply passage 60, the first discharge passage 63, and the second discharge passage 64 are closed by the first end block 11.

In the manifold block 14 closest to the supply-discharge block 13, the end of the supply passage 60 is connected to the concentrated supply passage of the supply-discharge block 13. In the manifold block 14 closest to the supply-discharge block 13, the ends of the first discharge passages 63 and the second discharge passage 64 are connected to the concentrated discharge passage of the supply-discharge block 13.

Further, each manifold block 14 includes a block-side pilot fluid discharge passage 65. The block-side pilot fluid discharge passage 65 has a first end, which opens in the placement surface 14a at a position facing the first facing surface 23a of the first coupling block 23 and is connected to the valve-side pilot fluid discharge passage 54. The block-side pilot fluid discharge passage 65 has a second end, which is connected to the first discharge passage 63. The electromagnetic valve manifold 10 includes a gasket 70 serving as a seal between the placement surface 14a and the valve body 21. The gasket 70 is arranged between the placement surface 14a and the valve body 21. The electromagnetic valve manifold 10 includes a check valve 71, which blocks flow of fluid from the block-side pilot fluid discharge passage 65 to the valve-side pilot fluid discharge passage 54.

When the pressure in the check valve 71 reaches a predetermined pressure, the check valve 71 is opened. The check valve 71 then permits flow of fluid from the valve-side pilot fluid discharge passage 54 to the block-side pilot fluid discharge passage 65. The fluid that has flowed into the check valve 71 from the valve-side pilot fluid discharge passage 54 flows out to the block-side pilot fluid discharge passage 65 via the check valve 71. When the pressure in the check valve 71 is lower than the predetermined pressure, the check valve 71 is closed. The check valve 71 thus blocks flow of fluid from the block-side pilot fluid discharge passage 65 to the valve-side pilot fluid discharge passage 54.

The end of the first output passage 61 on the side opposite from the placement surface 14a opens in a side surface 14e of each manifold block 14 that is orthogonal to the arrangement direction of the manifold blocks 14. The end of the second output passage 62 on the side opposite from the placement surface 14a opens in the side surface 14e of the manifold block 14. The end of the second output passage 62 that is on the side opposite from the placement surface 14a is located at a position closer to the placement surface 14a than the end of the first output passage 61 that is on the side opposite from the placement surface 14a.

Each manifold block 14 includes a tubular first coupling 81 and a tubular second coupling 82. The first coupling 81 is connected to the end of the first output passage 61 on the side opposite from the placement surface 14a. The second coupling 82 is connected to the end of the second output passage 62 on the side opposite from the placement surface 14a. Thus, the end of the first output passage 61 on the side opposite from the placement surface 14a is a first coupling connection hole 61e, which is connected to the first coupling 81. The end of the second output passage 62 on the side opposite from the placement surface 14a is a second coupling connection hole 62e, which is connected to the second coupling 82. The interior of the first coupling 81 is connected to the first output passage 61. The interior of the second coupling 82 is connected to the second output passage 62. The first coupling 81 and the second coupling 82 are tubular couplings into which flexible tubes 80 having a circular cross section are inserted.

As shown in FIG. 1, the first couplings 81 are adjacent to each other in the arrangement direction of the manifold blocks 14. The second couplings 82 are adjacent to each other in the arrangement direction of the manifold blocks 14. The tubes 80, which are connected to the first couplings 81 and the second couplings 82, are connected to a fluid pressure device (not shown).

The first coupling 81 will now be described with reference to FIGS. 3 and 4. Since the second coupling 82 has the same structure as the first coupling 81, detailed description of the second coupling 82 will be omitted.

Figure 3:
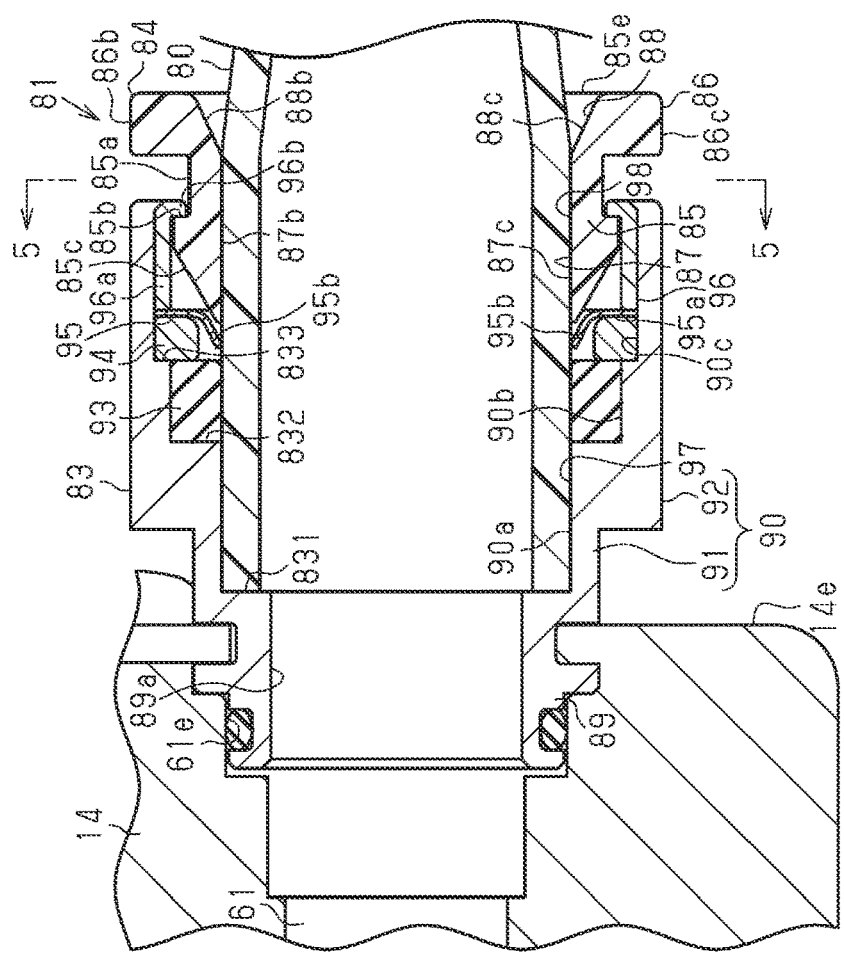
FIG. 3 is an enlarged longitudinal cross-sectional view of a section including a first coupling.

As shown in FIG. 3, the first coupling 81 includes a tubular coupling main portion 83 and a push ring 84 attached to the coupling main portion 83. The push ring 84 is made of plastic. The push ring 84 includes an elongated tube-shaped ring main portion 85 and an annular ring flange 86. The ring flange 86 is located on the outer circumferential surface of the ring main portion 85, and protrudes radially outward from a first end in the axial direction of the ring main portion 85.

The outer circumferential surface of the ring main portion 85 includes a ring circumferential surface 85a, a ring engagement surface 85b, and a ring inclined surface 85c. The ring circumferential surface 85a is continuous with the ring flange 86 and extends in the axial direction of the ring main portion 85. The ring engagement surface 85b protrudes radially outward from the end of the ring circumferential surface 85a on the side opposite from the ring flange 86. The ring engagement surface 85b is tubular. The outer circumferential edge of the ring engagement surface 85b is located closer to the axis of the ring main portion 85 than the outer circumferential surface of the ring flange 86. The ring inclined surface 85c is continuous with the outer circumferential edge of the ring engagement surface 85b and extends away from the ring circumferential surface 85a. On the ring inclined surface 85c, the outer diameter of the ring main portion 85 decreases as the distance from the ring circumferential surface 85a increases. Thus, the end of the push ring 84 on the side opposite from the ring flange 86, that is, the distal end of the push ring 84 is shaped like a hook.

Figure 4:
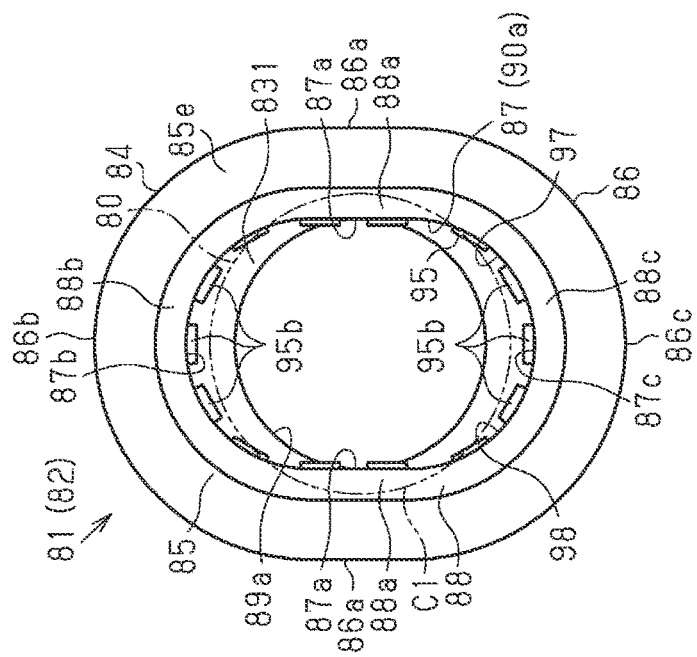
FIG. 4 is a front view of the first coupling.

When the push ring 84 is viewed in the axial direction of the ring main portion 85, the outer circumferential surface of the ring flange 86 includes flange flat surfaces 86a, which extend in parallel as shown in FIG. 4. The outer circumferential surface of the ring flange 86 includes a first flange curved surface 86b and a second flange curved surface 86c. The first flange curved surface 86b connects first ends of the flange flat surfaces 86a to each other, and the second flange curved surface 86c connects second ends of the flange flat surfaces 86a to each other. Therefore, the outer circumferential surface of the ring flange 86 is stadium-shaped when the ring flange 86 is viewed in the axial direction of the ring main portion 85.

As shown in FIGS. 3 and 4, the ring main portion 85 includes a first insertion hole 87 and a decreasing diameter hole 88. The first insertion hole 87 extends in the axial direction of the ring main portion 85 from the distal end of the ring main portion 85 toward the ring flange 86. As shown in FIG. 4, the inner circumferential surface of the first insertion hole 87 is stadium-shaped when the push ring 84 is viewed in the axial direction of the ring main portion 85. The inner circumferential surface of the first insertion hole 87 includes flat surfaces 87a, which extend in parallel when the push ring 84 is viewed in the axial direction of the ring main portion 85. The inner circumferential surface of the first insertion hole 87 includes a first curved surface 87b and a second curved surface 87c. The first curved surface 87b connects first ends of the flat surfaces 87a to each other, and the second curved surface 87c connects second ends of the flat surfaces 87a to each other.

The flat surfaces 87a are parallel with the flange flat surfaces 86a when the push ring 84 is viewed in the axial direction of the ring main portion 85. When the push ring 84 is viewed in the axial direction of the ring main portion 85, the first curved surface 87b extends in parallel with the first flange curved surface 86b, and the second curved surface 87c extends in parallel with the second flange curved surface 86c. Therefore, when the push ring 84 is viewed in the axial direction of the ring main portion 85, the inner circumferential surface of the first insertion hole 87 is stadium-shaped and mathematically similar to the outer circumferential surface of the ring flange 86.

When the push ring 84 is viewed in the axial direction of the ring main portion 85, the direction that is orthogonal to the flat surfaces 87a is a traverse direction of the first insertion hole 87, and the direction in which the flat surfaces 87a extend is a longitudinal direction of the first insertion hole 87.

As shown in FIG. 3, the decreasing diameter hole 88 connects an end face 85e of the ring main portion 85 to the edge of the first insertion hole 87 that is on the side opposite from the distal end of the ring main portion 85. When the push ring 84 is viewed in the axial direction of the ring main portion 85, the inner circumferential surface of the decreasing diameter hole 88 includes guiding surfaces 88a, which extend in parallel as shown in FIG. 4. One of the guiding surfaces 88a is continuous with one of the flat surfaces 87a of the first insertion hole 87. The other one of the guiding surfaces 88a is continuous with the other one of the flat surfaces 87a of the first insertion hole 87. The inner circumferential surface of the decreasing diameter hole 88 includes a first curved surface 88b and a second curved surface 88c. The first curved surface 88b connects first ends of the guiding surfaces 88a to each other, and the second curved surface 88c connects second ends of the guiding surfaces 88a to each other. The first curved surface 88b is continuous with the first curved surface 87b of the first insertion hole 87. The second curved surface 88c is continuous with the second curved surface 87c of the first insertion hole 87.

As shown in FIG. 3, the coupling main portion 83 is made of metal. The coupling main portion 83 includes a cylindrical insertion portion 89 and an elongated tube-shaped protruding portion 90. The axis of the insertion portion 89 agrees with the axis of the protruding portion 90. The protruding portion 90 includes a first tubular portion 91 and a second tubular portion 92. The first tubular portion 91 is continuous with the insertion portion 89. The second tubular portion 92 is continuous with the end of the first tubular portion 91 on the side opposite from the insertion portion 89. The axis of the first tubular portion 91 agrees with the axis of the second tubular portion 92. Therefore, axes of the insertion portion 89, the first tubular portion 91, and the second tubular portion 92 form the axis of the coupling main portion 83.

When the coupling main portion 83 is viewed in the axial direction, the outer circumferential surface of the second tubular portion 92 is stadium-shaped and extends along the outer circumferential surface of the ring flange 86 of the push ring 84, so as to overlap with the outer circumferential surface of the ring flange 86. The outer diameter of the second tubular portion 92 is equal to that of the ring flange 86. The outer circumferential surface of the first tubular portion 91 is stadium-shaped, is closer to the axis of the protruding portion 90 than the outer circumferential surface of the second tubular portion 92, and extends along the outer circumferential surface of the second tubular portion 92. Therefore, the outer diameter of the first tubular portion 91 is smaller than the outer diameter of the second tubular portion 92.

The protruding portion 90 includes a second insertion hole 90a, a third insertion hole 90b, and a fourth insertion hole 90c. The second insertion hole 90a is closer to the insertion portion 89 than the third insertion hole 90b and the fourth insertion hole 90c. When viewed in the axial direction of the coupling main portion 83, the inner circumferential surface of the second insertion hole 90a is stadium-shaped and extends along the inner circumferential surface of the first insertion hole 87 of the push ring 84, so as to overlap with the inner circumferential surface of the first insertion hole 87. Therefore, the diameter of the second insertion hole 90a is equal to that of the first insertion hole 87.

The third insertion hole 90b is connected to the second insertion hole 90a. The inner circumferential surface of the third insertion hole 90b is stadium-shaped, is farther from the axis of the protruding portion 90 than the inner circumferential surface of the second insertion hole 90a, and extends along the inner circumferential surface of the second insertion hole 90a. Therefore, the diameter of the third insertion hole 90b is larger than that of the second insertion hole 90a.

The fourth insertion hole 90c is connected to the end of the third insertion hole 90b on the side opposite from the second insertion hole 90a. The inner circumferential surface of the fourth insertion hole 90c is stadium-shaped, is farther from the axis of the protruding portion 90 than the inner circumferential surface of the third insertion hole 90b, and extends along the inner circumferential surface of the third insertion hole 90b. Therefore, the diameter of the fourth insertion hole 90c is larger than that of the third insertion hole 90b.

The insertion portion 89 includes a connection hole 89a, which is connected to the second insertion hole 90a. The connection hole 89a is a circular hole. As shown in FIG. 4, the diameter of the connection hole 89a is equal to the diameter in the traverse direction of the second insertion hole 90a. That is, the diameter of the connection hole 89a is equal to the diameter in the traverse direction of the first insertion hole 87 of the push ring 84.

As shown in FIG. 3, the coupling main portion 83 includes an annular first step surface 831. The first step surface 831 extends in a direction orthogonal to the axial direction of the coupling main portion 83, and connects the inner circumferential surface of the second insertion hole 90a to the inner circumferential surface of the connection hole 89a. The coupling main portion 83 also includes an annular second step surface 832. The second step surface 832 extends in a direction orthogonal to the axial direction of the coupling main portion 83, and connects the inner circumferential surface of the second insertion hole 90a to the inner circumferential surface of the third insertion hole 90b. Further, the coupling main portion 83 includes an annular third step surface 833. The third step surface 833 extends in a direction orthogonal to the axial direction of the coupling main portion 83, and connects the inner circumferential surface of the third insertion hole 90b to the inner circumferential surface of the fourth insertion hole 90c.

The first coupling 81 includes an annular seal member 93. The seal member 93 is attached to the inner circumferential surface of the third insertion hole 90b. The seal member 93 is made of rubber. The first coupling 81 includes an annular retaining member 94. The retaining member 94 is fitted in the inner circumferential surface of the fourth insertion hole 90c, while being held in contact with the third step surface 833. The inner circumferential surface of the retaining member 94 is closer to the axis of the coupling main portion 83 than the inner circumferential surface of the third insertion hole 90b, and is farther from the axis of the coupling main portion 83 than the inner circumferential surface of the second insertion hole 90a. The seal member 93 is held between the second step surface 832 and the retaining member 94, so as to be fixed to the inner circumferential surface of the third insertion hole 90b, while being positioned on the inner side of the third insertion hole 90b. The retaining member 94 prevents the seal member 93 from being removed from the third insertion hole 90b.

The first coupling 81 includes a chuck 95. The chuck 95 is located in the fourth insertion hole 90c. The chuck 95 includes an annular chuck main portion 95a and chuck lugs 95b. The chuck lugs 95b protrude from the inner circumferential surface of the chuck main portion 95a. The chuck lugs 95b are arranged at equal intervals in the circumferential direction of the chuck main portion 95a. The chuck lugs 95b are thin plates that are curved to be closer to the axis of the chuck main portion 95a as the distance from the inner circumferential surface of the chuck main portion 95a increases.

The first coupling 81 includes a tubular collar member 96. The collar member 96 is inserted into the fourth insertion hole 90c. The collar member 96 includes a tubular collar main portion 96a and an annular collar engagement portion 96b. The collar engagement portion 96b protrudes radially inward from an end in the axial direction of the collar main portion 96a. The outer circumferential surface of the collar main portion 96a extends along the inner circumferential surface of the fourth insertion hole 90c. The outer circumferential surface of the collar main portion 96a is fitted into the inner circumferential surface of the fourth insertion hole 90c. The collar member 96 is thus attached to the fourth insertion hole 90c. When viewed in the axial direction of the coupling main portion 83, the inner circumferential surface of the collar main portion 96a is stadium-shaped and extends along the inner circumferential surface of the third insertion hole 90b, so as to overlap with the inner circumferential surface of the third insertion hole 90b.

The end of the collar main portion 96a on the side opposite from the collar engagement portion 96b and the retaining member 94 hold the outer circumference of the chuck main portion 95a of the chuck 95 in between. Since the chuck main portion 95a is held between the retaining member 94 and the collar main portion 96a, the chuck 95 is fixed in the fourth insertion hole 90c. The chuck lugs 95b are arranged in the fourth insertion hole 90c so as to be bent toward the seal member 93. The distal ends of the chuck lugs 95b are arranged on the inner side of the retaining member 94. FIG. 4 shows a state before the chuck lugs 95b are elastically deformed. When viewed in the axial direction of the coupling main portion 83, the distal ends of the chuck lugs 95b are closer to the axis of the coupling main portion 83 than the inner circumferential surface of the second insertion hole 90a in the state shown in FIG. 4.

As shown in FIG. 3, the inner diameter of the collar engagement portion 96b is larger than the outer diameter of the ring circumferential surface 85a of the push ring 84, and is smaller than the outer diameter of the outer circumferential edge of the ring engagement surface 85b. When the ring main portion 85 of the push ring 84 is forcibly pushed into the collar member 96, the ring inclined surface 85c passes the collar engagement portion 96b, so that the ring circumferential surface 85a is located on the inner side of the collar engagement portion 96b. In this manner, the push ring 84 is attached to the coupling main portion 83 by means of the collar member 96.

In a state in which the push ring 84 is attached to the coupling main portion 83, the distal end of the ring main portion 85 faces the chuck lugs 95b in the axial direction of the coupling main portion 83. The ring engagement surface 85b contacts the collar engagement portion 96b, so that the coupling main portion 83 is prevented from being removed from the push ring 84. The push ring 84 is pushed into the coupling main portion 83 until the ring flange 86 contacts the collar member 96.

In a state in which the ring engagement surface 85b is in contact with the collar engagement portion 96b, the distal end of the ring main portion 85 is separated from the chuck lugs 95b. When the push ring 84 is pushed until the ring flange 86 contacts the collar member 96, the distal end of the ring main portion 85 contacts the chuck lugs 95b. The chuck lugs 95b contact the ring inclined surface 85c to be elastically deformed, so that the distal ends of the chuck lugs 95b are moved away from the axis of the coupling main portion 83.

The first coupling 81 is connected to the first coupling connection hole 61e by inserting the insertion portion 89 of the coupling main portion 83 into the first coupling connection hole 61e. The protruding portion 90, the collar member 96, and the push ring 84 of the coupling main portion 83 form an elongated tube-shaped portion that protrudes from the side surface 14e of the manifold block 14. Thus, the first couplings 81 partly protrude to the outside from the manifold blocks 14. The part of each of the first couplings 81 that protrudes from the manifold block 14 has the shape of an elongated tube.

A part of the tube 80 is located in the decreasing diameter hole 88, the first insertion hole 87, the fourth insertion hole 90c, the third insertion hole 90b, and the second insertion hole 90a. Thus, the decreasing diameter hole 88, the first insertion hole 87, the fourth insertion hole 90c, the third insertion hole 90b, and the second insertion hole 90a form a tube insertion hole 97, into which the tube 80 is inserted. The tube insertion hole 97 is connected to the first output passage 61 via the connection hole 89a. The tube insertion hole 97 is thus connected to the passage inside the manifold block 14.

The imaginary circle Cl in FIG. 4 represents the outer circumferential surface of the tube 80 before being deformed. As shown in FIG. 4, the diameter in the longitudinal direction of the first insertion hole 87 and the diameter in the longitudinal direction of the second insertion hole 90a are larger than the outer diameter of the tube 80 before being deformed. The diameter in the traverse direction of the first insertion hole 87 and the diameter in the traverse direction of the second insertion hole 90a are smaller than the outer diameter of the tube 80 before being deformed. Thus, the first insertion hole 87 and the second insertion hole 90a form a small diameter hole 98, which is a stadium-shaped hole with a diameter in the traverse direction being smaller than the outer diameter of the tube 80 before being deformed. Therefore, a part of the tube insertion hole 97 is the small diameter hole 98, which is a stadium-shaped hole.

The open edge of the decreasing diameter hole 88 is the open edge of the tube insertion hole 97. The tube insertion hole 97 thus has the decreasing diameter hole 88. The decreasing diameter hole 88 connects the open edge of the tube insertion hole 97 to the small diameter hole 98. Also, the outer diameter of the decreasing diameter hole 88 decreases from the open edge of the tube insertion hole 97 toward the small diameter hole 98. The open edge of the tube insertion hole 97 is a stadium-shaped hole that is mathematically similar to the small diameter hole 98.

As shown in FIG. 3, the connection hole 89*a* connects the interior of the tube 80, which is inserted into the small diameter hole 98, and the first output passage 61 to each other. The first step surface 831 serves as a stopper surface that contacts the distal end of the tube 80 inserted into the second insertion hole 90*a*.

The traverse direction of the first insertion hole 87 and the second insertion hole 90*a* is the traverse direction of the first coupling 81. The longitudinal direction of the first insertion hole 87 and the second insertion hole 90*a* is the longitudinal direction of the first coupling 81. Thus, when the first coupling 81 is viewed in the axial direction, the traverse direction of the small diameter hole 98 agrees with the traverse direction of the first coupling 81.

As shown in FIG. 1, when viewed in the axial direction, the first couplings 81 are arranged such that the traverse direction of each first coupling 81 agrees with the arrangement direction of the manifold blocks 14. When viewed in the axial direction, the second couplings 82 are arranged such that the traverse direction of each second coupling 82 agrees with the arrangement direction of the manifold blocks 14.

An operation of the present embodiment will now be described.

It is now assumed that a tube 80 having an outer diameter larger than the diameter in the traverse direction of the small diameter hole 98 is inserted into the tube insertion hole 97 of each first coupling 81. In this case, when the tube 80 is inserted from the open edge of the tube insertion hole 97, the tube 80 is inserted into the first insertion hole 87, while being guided by the guiding surfaces 88*a* of the decreasing diameter hole 88.

Figure 5:
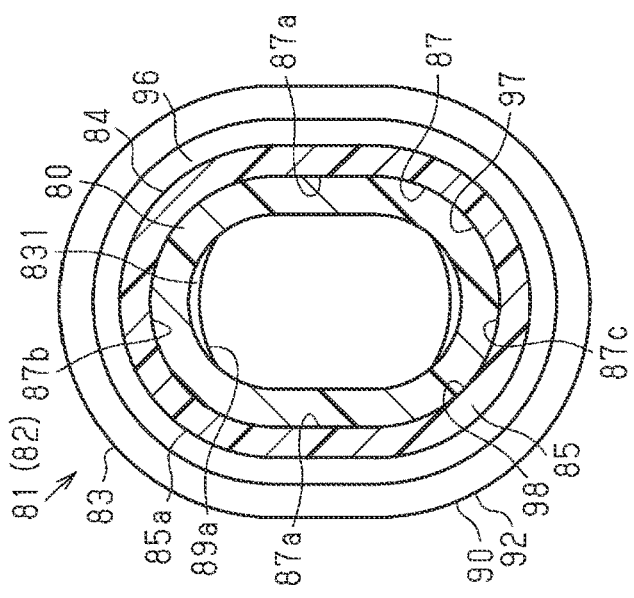
FIG. 5 is a cross-sectional view taken along line 5-5 of FIG. 3.

As shown in FIG. 5, the tube 80, which is inserted into the first insertion hole 87, is pushed and deformed by the flat surfaces 87*a* in the inner circumferential surface of the first insertion hole 87. The flat surfaces 87*a* are located on the opposite sides in the traverse direction of the first insertion hole 87. The tube 80 is inserted, while being deformed, into the first insertion hole 87 toward the space in the vicinity of the first curved surface 87*b* to the space in the vicinity of the second curved surface 87*c*. The first and second curved surfaces 87*b*, 87*c* are located on the opposite sides in the longitudinal direction of the first insertion hole 87. As a result, the tube 80 is elastically deformed by conforming to the inner circumferential surface of the first insertion hole 87.

As shown in FIG. 3, the tube 80 contacts the chuck lugs 95*b* and passes the inner side of the chuck 95, while pushing away the chuck lugs 95*b*. At this time, the tube 80 passes the inner side of the seal member 93, while contacting the inner circumferential surface of the seal member 93. The tube 80 is inserted into the second insertion hole 90*a* until the distal end contacts the first step surface 831. Accordingly, the interior of the tube 80 is connected to the first output passage 61 via the connection hole 89*a*. A tube 80 is inserted into the tube insertion holes 97 of each second coupling 82 in the same manner as the tube 80 that is inserted into the tube insertion hole 97 of each first coupling 81. That is, the tube 80 is inserted into the second insertion hole 90*a* until the distal end contacts the first step surface 831. Accordingly, the interior of the tube 80 is connected to the second output passage 62 via the connection hole 89*a*.

The outer circumferential surface of the seal member 93 is in a close contact with the inner circumferential surface of the third insertion hole 90*b*. The inner circumferential surface of the seal member 93 is in a close contact with the outer circumferential surface of the tube 80. The seal member 93 thus limits leakage of fluid to the outside through the gap between the outer circumferential surface of the tube 80 and the tube insertion hole 97. Also, when the tube 80 is inserted into the tube insertion hole 97 until the distal end contacts the first step surface 831, the chuck lugs 95*b* return to their original shapes before being pushed away by the tube 80, so that the distal ends of the chuck lugs 95*b* bite into the outer circumferential surface of the tube 80. This prevents the tube 80 from being removed from the tube insertion hole 97.

When removing the tube 80 from tube insertion hole 97, the push ring 84 is pushed toward the inner side of the coupling main portion 83 until the ring flange 86 contacts the collar member 96. When the distal end of the ring main portion 85 contacts the chuck lugs 95*b*, the chuck lugs 95*b* are elastically deformed, so that the distal ends of the chuck lugs 95*b* are separated from the outer circumferential surface of the tube 80. This cancels the biting of the distal end of the chuck lugs 95*b* into the outer circumferential surface of the tube 80. The tube 80 is therefore allowed to be pulled out of the tube insertion hole 97.

As shown in FIG. 2, when power is supplied to the solenoid portion 51, the pilot valve unit 50 connects the pilot fluid supply passage 52 and the pilot fluid output passage 53 to each other, and disconnects the pilot fluid output passage 53 and the valve-side pilot fluid discharge passage 54 from each other. Then, the fluid from the fluid supply source flows in from the supply coupling 13*a* via piping, and is supplied, as pilot fluid, to the first pilot pressure chamber 44 via the concentrated supply passage of the supply-discharge block 13, the supply passage 60, the supply port 27, the pilot fluid supply passage 52, and the pilot fluid output passage 53.

At this time, the pressure receiving area of the second piston 46, which receives the pressure of the pilot fluid in the second pilot pressure chamber 48, is smaller than the pressure receiving area of the first piston 42, which receives the pressure of the pilot pressure in the first pilot pressure chamber 44. This moves the valve member 25 toward the second piston accommodating recess 45. This allows the supply port 27 and the first output port 28 to be connected to each other, and the second output port 29 and the second discharge port 31 to be connected to each other. Also, the third spool packing 38 of the third valve portion 253 serves as a seal between the supply port 27 and the second output port 29, and the second spool packing 37 of the second valve portion 252 serves as a seal between the first output port 28 and the first discharge port 30.

Then, the fluid from the fluid supply source flows in from the supply coupling 13*a* via piping, and is supplied to the fluid pressure device via the concentrated supply passage of the supply-discharge block 13, the supply passage 60, the supply port 27, the first output port 28, the first output passage 61, the connection hole 89*a* of the first coupling 81, and the tube 80 connected to the first coupling 81. Also, the fluid from the fluid pressure device is discharged to the atmosphere via the tube 80 connected to the second coupling 82, the connection hole 89*a* of the second coupling 82, the second output passage 62, the second output port 29, the second discharge port 31, the second discharge passage 64, the concentrated discharge passage of the supply-discharge block 13, the discharge coupling 13b, and piping.

When the supply of power to the solenoid portion 51 is stopped, the pilot valve unit 50 connects the pilot fluid output passage 53 and the valve-side pilot fluid discharge passage 54 to each other, and disconnects the pilot fluid supply passage 52 and the pilot fluid output passage 53 from each other. This stops the supply of fluid from the fluid supply source to the first pilot pressure chamber 44 via the piping, the supply coupling 13a, the concentrated supply passage of the supply-discharge block 13, the supply passage 60, the supply port 27, the pilot fluid supply passage 52, and the pilot fluid output passage 53. Then, the fluid in the first pilot pressure chamber 44 is discharged to the atmosphere via the pilot fluid output passage 53, the valve-side pilot fluid discharge passage 54, the block-side pilot fluid discharge passage 65, the first discharge passage 63, the concentrated discharge passage of the supply-discharge block 13, the discharge coupling 13b, and the piping. Accordingly, the valve member 25 is moved toward the first piston accommodating recess 41. This allows the supply port 27 and the second output port 29 to be connected to each other, and the first output port 28 and the first discharge port 30 to be connected to each other. Also, the first spool packing 36 of the first valve portion 251 serves as a seal between the supply port 27 and the first output port 28, and the fourth spool packing 39 of the fourth valve portion 254 serves as a seal between the second output port 29 and the second discharge port 31.

Then, the fluid from the fluid supply source flows in from the supply coupling 13a via the piping, and is supplied to the fluid pressure device via the concentrated supply passage of the supply-discharge block 13, the supply passage 60, the supply port 27, the second output port 29, the second output passage 62, the connection hole 89a of the second coupling 82, and the tube 80 connected to the second coupling 82. Also, the fluid from the fluid pressure device is discharged to the atmosphere via the tube 80 connected to the first coupling 81, the connection hole 89a of the first coupling 81, the first output passage 61, the first output port 28, the first discharge port 30, the first discharge passage 63, the concentrated discharge passage of the supply-discharge block 13, the discharge coupling 13b, and the piping.

The electromagnetic valve 20 is of an internal pilot type, in which some of the fluid supplied to the supply port 27 is supplied to the first pilot pressure chamber 44 and the second pilot pressure chamber 48. The valve member 25 is reciprocated in the valve hole 26 by the pilot fluid, so that connections of the ports are switched.

A comparative exemplary case assumes tube insertion holes 97 are circular holes, and the diameter of each of the tube insertion holes 97 is equal to the diameter in the traverse direction of each of the small diameter holes 98. As compared to this case, the electromagnetic valves 20 maximizes the cross-sectional flow area of the tube 80 inserted into the tube insertion hole 97. Accordingly, the flow rate of the fluid flowing in the manifold block 14 is increased. This increases the amount of fluid supplied to the fluid pressure device and the amount of fluid discharged from the fluid pressure device, thereby improving the responsiveness of the fluid pressure device.

The above-described embodiment has the following advantages.

(1) The parts of the first coupling 81 and the second coupling 82 that protrude from the manifold block 14 each have the shape of an elongated tube. When the first coupling 81 and the second coupling 82 are viewed in the axial direction, the traverse direction of the first coupling 81 and the second coupling 82 agree with the arrangement direction of the manifold blocks 14. A part of the tube insertion hole 97 is the small diameter hole 98, which is a stadium-shaped hole. When the first coupling 81 and the second coupling 82 are viewed in the axial direction, the traverse direction of the small diameter hole 98 agrees with the traverse direction of the first coupling 81 and the second coupling 82.

It is now assumed that a tube 80 having an outer diameter larger than the diameter in the traverse direction of the small diameter hole 98 is inserted into the tube insertion hole 97. In this case, the tube 80 is pushed and deformed by the sections of the inner circumferential surface of the small diameter hole 98 on the opposite sides in the traverse direction of the small diameter hole 98. The tube 80 is inserted into the small diameter hole 98, while being deformed into the spaces on the opposite sides in the longitudinal direction of the small diameter hole 98. Therefore, even if the outer diameter of the tube 80 is larger than the diameter in the traverse direction of the small diameter hole 98, the tube 80 can be inserted into the tube insertion holes 97. A comparative exemplary case assumes the tube insertion holes 97 are circular holes, and the diameter of each of the tube insertion holes 97 is equal to the diameter in the traverse direction of each of the small diameter holes 98. As compared to this case, the cross-sectional flow area of the tube 80 inserted into the tube insertion hole 97 is maximized in the above-described embodiment. The tube 80 with a maximized cross-sectional flow area can be inserted into the tube insertion hole 97 without increasing, in the arrangement direction of the manifold blocks 14, the outer diameter of the parts of the first coupling 81 and the second coupling 82 that protrude from the manifold block 14. Thus, it is not necessary to increase the interval between adjacent manifold blocks 14 in order to prevent the first couplings 81 and the second couplings 82, that are adjacent to each other in the arrangement direction of the manifold blocks 14, from interfering with each other. Therefore, it is possible to increase the flow rate of fluid flowing in passages, while limiting an increase in the size of the electromagnetic valve manifold 10.

(2) The tube insertion hole 97 has the decreasing diameter hole 88. The decreasing diameter hole 88 connects the open edge of the tube insertion hole 97 to the small diameter hole 98. Also, the outer diameter of the decreasing diameter hole 88 decreases from the open edge of the tube insertion hole 97 toward the small diameter hole 98. This configuration allows the tube 80 inserted into the tube insertion hole 97 from the open edge to be easily inserted toward the small diameter hole 98 while being guided by the decreasing diameter hole 88. Accordingly, the tube 80 is easily inserted into the small diameter hole 98.

(3) The open edge of the tube insertion hole 97 is a stadium-shaped hole that is mathematically similar to the small diameter hole 98. For example, a comparative exemplary case assumes the open edge of the tube insertion hole 97 is a circular hole having a diameter that is equal to the diameter in the longitudinal direction of the small diameter hole 98. As compared to this case, the above-described embodiment increases the thickness of the sections located on the opposite sides in the traverse direction of the first coupling 81 or the second coupling 82. This easily ensures the strength of the first coupling 81 and the second coupling 82.

(4) The flow rate of the fluid flowing in the manifold block 14 is increased. This increases the amount of fluid supplied to the fluid pressure device and the amount of fluid discharged from the fluid pressure device, thereby improving the responsiveness of the fluid pressure device.

(5) The tube 80 with a maximized cross-sectional flow area can be inserted into the tube insertion hole 97 without increasing the interval between the adjacent manifold blocks 14. This prevents the size of the electromagnetic valve manifold 10 from being increased, and thus reduces the footprint of the electromagnetic valve manifold 10.

(6) The flow rate of fluid flowing in the passage of the manifold block 14 can be increased by using a tube 80 having a circular cross section. Therefore, the shape of the tube 80 does not need to be changed in order to increase the cross-sectional flow area of the tube 80. Thus, an already available tube 80 having a circular cross section can be used.

The above-described embodiment may be modified as follows. The above-described embodiment and the following modifications can be combined as long as the combined modifications remain technically consistent with each other.

Figure 6:
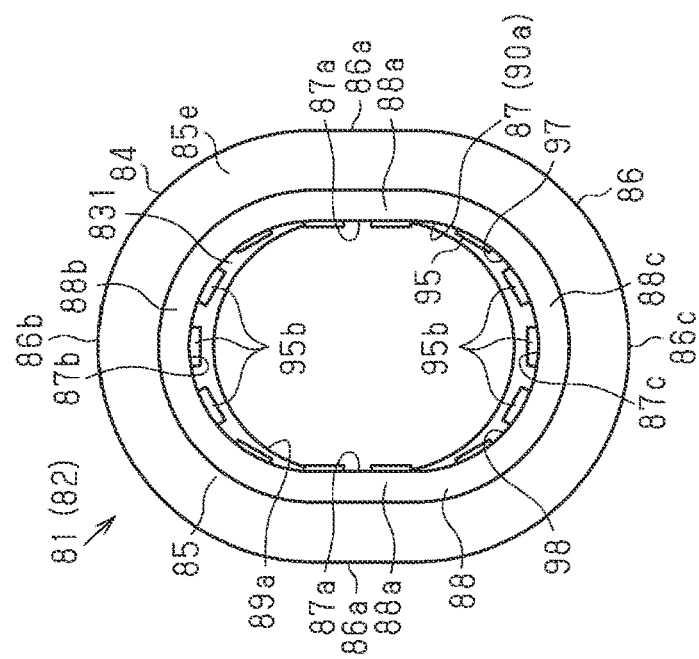
FIG. 6 is a front view showing a first coupling according to another embodiment.

As shown in FIG. 6, the connection hole 89a may be stadium-shaped. When the first coupling 81 is viewed in the axial direction, the traverse direction of the connection hole 89a agrees with the traverse direction of the small diameter hole 98. The diameter in the traverse direction of the connection hole 89a is equal to the diameter in the traverse direction of the small diameter hole 98, and the diameter in the longitudinal direction of the connection hole 89a is smaller than the diameter in the longitudinal direction of the small diameter hole 98. For example, a comparative exemplary case assumes the connection hole 89a is a circular hole, and the diameter of the connection hole 89a is equal to the diameter in the traverse direction of the small diameter hole 98. As compared to this case, the modification increases the cross-sectional flow area of the connection hole 89a. Thus, the flow rate of the fluid flowing in the manifold block 14 is further increased.

The tube insertion hole 97 does not need to include the decreasing diameter hole 88. For example, the edge of the first insertion hole 87 in the vicinity of the ring flange 86 may serve as the open edge of the tube insertion hole 97.

The entire tube insertion hole 97 may be the stadium-shaped small diameter hole 98. In short, it suffices if at least part of the tube insertion hole 97 is a stadium-shaped small diameter hole.

The open edge of the tube insertion hole 97 may be a stadium-shaped hole that is not mathematically similar to the small diameter hole 98.

Figure 7:
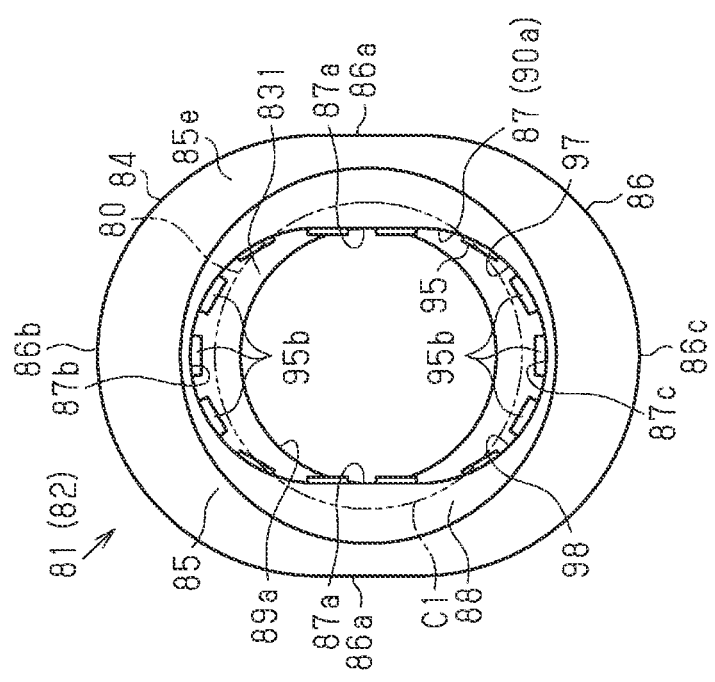
FIG. 7 is a front view showing a first coupling according to another embodiment.

For example, the open edge of the tube insertion hole 97 may be a circular hole having a diameter that is larger than the diameter in the longitudinal direction of the small diameter hole 98 as shown in FIG. 7. When the open edge of the tube insertion hole 97 is a circular hole, the diameter of the open edge is larger than the outer diameter of the tube 80 before being deformed.

Therefore, when the ring flange 86 is viewed in the axial direction of the ring main portion 85, the outer circumferential surface of the ring flange 86 may have an elliptic shape without the flange flat surfaces 86a. Also, the outer circumferential surface of the ring flange 86 may be rectangular when the ring flange 86 is viewed in the axial direction of the ring main portion 85. In a case in which the outer circumferential surface of the ring flange 86 is rectangular when the ring flange 86 is viewed in the axial direction of the ring main portion 85, the four corners of the ring flange 86 may be rounded or chamfered. Also, when the coupling main portion 83 is viewed in the axial direction, the outer circumferential surface of the second tubular portion 92 may have an elliptic or rectangular shape and extend along the outer circumferential surface of the ring flange 86 so as to overlap with the outer circumferential surface of the ring flange 86.

Further, when the push ring 84 is viewed in the axial direction of the ring main portion 85, the inner circumferential surface of the first insertion hole 87 may have an elliptic shape without the flat surfaces 87a. Also, when the push ring 84 is viewed in the axial direction of the ring main portion 85, the inner circumferential surface of the first insertion hole 87 may be rectangular. In a case in which the inner circumferential surface of the first insertion hole 87 is rectangular, the four corners of the push ring 84 may be rounded or chamfered. Also, when viewed in the axial direction of the coupling main portion 83, the inner circumferential surface of the second insertion hole 90a may have an elliptic or rectangular shape and extend along the inner circumferential surface of the first insertion hole 87 so as to overlap with the inner circumferential surface of the first insertion hole 87 of the push ring 84.

In short, it suffices if the small diameter holes 98 is a stadium-shaped hole, and the traverse direction of the small diameter hole 98 agrees with the traverse direction of a coupling when viewed in the axial direction of the coupling. Also, it suffices if parts of couplings that protrude from the manifold block 14 each have the shape of an elongated tube.

Figure 8:
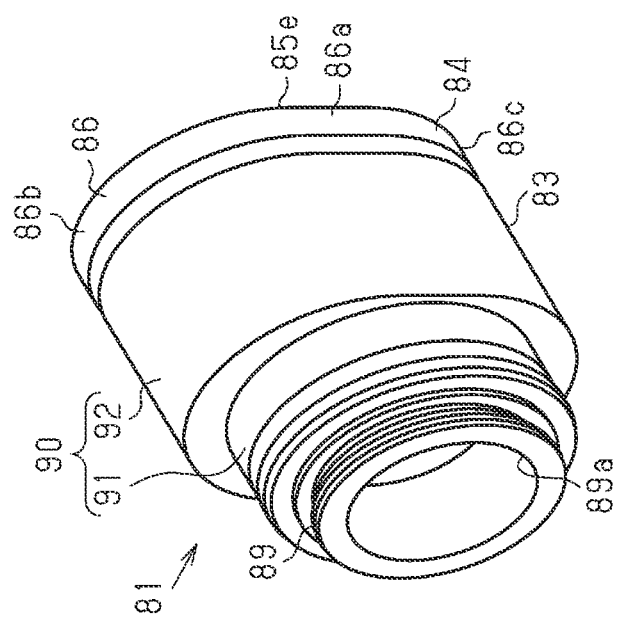
FIG. 8 is a perspective view showing a first coupling according to another embodiment.

As shown in FIG. 8, the insertion portion 89 of the coupling main portion 83 may have the shape of an elongated tube. In this case, the outer circumferential surface of the insertion portion 89 is closer to the axis of the protruding portion 90 than the outer circumferential surface of the first tubular portion 91, and extends along the outer circumferential surface of the first tubular portion 91. Therefore, the outer diameter of the insertion portion 89 is smaller than the outer diameter of the first tubular portion 91. When the insertion portion 89 is viewed in the axial direction, the traverse direction of the insertion portion 89 agrees with the arrangement direction of the manifold blocks 14. In this case, the first coupling connection hole 61e or the second coupling connection hole 62e, into which the insertion portion 89 is inserted, is a stadium-shaped hole conforming to the outer circumferential surface of the insertion portion 89. This increases the cross-sectional flow area of the connection hole 89a without increasing the outer diameter of the insertion portion 89 in the arrangement direction of the manifold blocks 14. Accordingly, the amount of fluid flowing in the passage in the manifold block 14 is further increased, while preventing the size of the electromagnetic valve manifold 10 from being increased. Also, when viewed in the axial direction of the insertion portion 89, the outer circumferential surface of the insertion portion 89 may have an elliptic or rectangular shape.

The push ring 84 may be made of metal.

The coupling main portion 83 may be made of plastic.

Some of the couplings may be configured such that the valve bodies 21 of the electromagnetic valves 20 protrude outward, and each of the tube insertion holes 97 is connected to a corresponding passage formed inside the valve bodies 21. In this case, the valve bodies 21 of the electromagnetic valves 20 correspond to the passage forming members that are arranged in one direction, each valve body 21 having a passage inside.

The electromagnetic valve 20 may be, for example, a three-port electromagnetic valve.

The electromagnetic valve 20 may be configured such that the outer diameter of the first piston 42 and the outer diameter of the second piston 46 are the same, and an urging spring that urges the valve member 25 toward the first piston accommodating recess 41 may be accommodated in the second piston accommodating recess 45. Also, the electromagnetic valve 20 may be configured such that the pressure in the first pilot pressure chamber 44 acts against the urging force of the urging spring, so that the valve member 25 is moved toward the second piston accommodating recess 45.

In the above-described embodiment, the electromagnetic valve 20 is of an internal pilot type. However, the electromagnetic valve 20 may be of an external pilot type, which supplies fluid supplied from the outside, not from the supply port 27, to the first pilot pressure chamber 44 and the second pilot pressure chamber 48.

The electromagnetic valve 20 may be of a double pilot type having two pilot valve units 50.

Not all of the manifold blocks 14 need to include the electromagnetic valve 20. The manifold is not limited to the electromagnetic valve manifold 10, which includes the electromagnetic valve 20. However, any type of manifold may be employed as long as it includes passage forming members that are arranged in one direction and each has a passage inside. Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A manifold, comprising:
   passage forming members that are arranged in one direction, each passage forming member having a passage inside; and
   tubular couplings that partially protrude outward from the respective passage forming members, each coupling including a tube insertion hole connected to the passage, wherein
   the couplings are adjacent to each other in an arrangement direction of the passage forming members,
   flexible tubes, each having a circular cross section, are inserted into respective tube insertion holes of the couplings,
   parts of the couplings that protrude from the passage forming members each have a shape of an elongated tube,
   when each coupling is viewed in an axial direction, a traverse direction of the coupling agrees with the arrangement direction,
   at least part of each tube insertion hole is a stadium-shaped small diameter hole, and
   when each coupling is viewed in the axial direction, a traverse direction of the small diameter hole agrees with the traverse direction of the coupling.

2. The manifold according to claim 1, wherein
   each tube insertion hole includes a decreasing diameter hole,
   the decreasing diameter hole connects an open edge of the tube insertion hole to the small diameter hole, and
   an outer diameter of the decreasing diameter hole decreases from the open edge toward the small diameter hole.

3. The manifold according to claim 2, wherein the open edge is a stadium-shaped hole that is mathematically similar to the small diameter hole.

4. The manifold according to claim 1, wherein
   each coupling includes
   a connection hole that connects the passage to an interior of the tube inserted into the small diameter hole, and
   a stopper surface that connects the small diameter hole and the connection hole to each other, a distal end of the tube inserted into the small diameter hole contacting the stopper surface,
   the connection hole is a stadium-shaped hole,
   when each coupling is viewed in the axial direction, a traverse direction of the connection hole agrees with the traverse direction of the small diameter hole,
   a diameter in the traverse direction of the connection hole is equal to a diameter in the traverse direction of the small diameter hole, and
   a diameter in a longitudinal direction of the connection hole is smaller than a diameter in a longitudinal direction of the small diameter hole.

5. The manifold according to claim 4, wherein
   each coupling includes an insertion portion that includes the connection hole and is inserted into a coupling connecting hole of the passage forming member,
   the insertion portion has a shape of an elongated tube, and
   when the insertion portion is viewed in an axial direction, a traverse direction of the insertion portion agrees with the arrangement direction.

* * * * *